United States Patent

[11] 3,607,268

[72] Inventor Eugene R. Skarvinko
Binghamton, N.Y.

[21] Appl. No. 749,184
[22] Filed July 31, 1968
[45] Patented Sept. 21, 1971
[73] Assignee International Business Machines Corporation
Armonk, N.Y.

[54] PROCESS FOR PROVIDING APERTURE-TYPE FILM RECORD CARDS
9 Claims, 2 Drawing Figs.

[52] U.S. Cl. .......... 96/27 R, 40/158 B, 40/63 A, 40/70 A
[51] Int. Cl. .......... G03c 15/04
[50] Field of Search .......... 40/158, 158 B, 63 A, 64 A, 70 A; 96/27

[56] References Cited
UNITED STATES PATENTS
3,283,432 11/1966 Kollar et al. .......... 40/158

*Primary Examiner*—George F. Lesmes
*Assistant Examiner*—M. B. Wittenberg
*Attorney*—Sughrue, Rothwell, Mion, Zinn & Macpeak

ABSTRACT: A method for providing film record cards whereby a film-forming solution, emulsion or latex is poured into the aperture of a card structure while said card structure is supported on a base which is nonadherent to said film, and is dried so as to form a strongly adherent film to the peripheral edges of said aperture. Film record cards prepared by the foregoing method.

INVENTOR
EUGENE R. SKARVINKO

BY

Sughrue, Rothwell, Mion, Zinn & Macpeak
ATTORNEYS

PROCESS FOR PROVIDING APERTURE-TYPE FILM RECORD CARDS

BACKGROUND OF THE INVENTION

1. Field of the Invention

This invention relates to record cards containing photosensitive films and more particularly to record cards wherein photosensitive film chips are mounted within apertures or specially provided openings within a card structure.

2. Discussion of the Prior Art

One convenient technique for record and information storage has been the use of microfilm record cards, known as aperture cards. Aperture cards generally comprise a card body structure having a photosensitive film mounted within one or more suitably selected openings within the card. This type of information storage means is considered highly advantageous in that information can be received not only on the photosensitive film portion, but also on the remaining body structure as well.

According to the prior art technique for preparing aperture cards, a chip of photosensitive material is bound to the peripheral edges of the aperture by means of adhesives or glues. This technique has proven to be generally satisfactory but adhesive binding requires costly and complex apparatus and sometimes results in weak adhesion between the film and the card. Moreover, adhesive bonding may result in a card having slightly raised edges immediately adjacent to the bond due to the thickness of the bond itself. The surface area around the film bond, therefore, is subject to increased wear and damage. These prior art techniques further involve a relatively costly two-step procedure whereby the chip must first be prepared in a first operation and then mounted to the card in a second operation. It would, therefore, be desirable to minimize production costs by preparing aperture or other types of film record cards by a simple one-step procedure whereby the film is simultaneously prepared and mounted. It would also be desirable to provide a film record card wherein the entire surface of the card is on the same plane so that surface wear is evenly distributed throughout the entire surface.

Accordingly, it is an object of this invention to provide film record cards, such as aperture cards, by a simple and inexpensive one-step procedure. It is further an object of this invention to provide film record cards whereby the use of adhesives and glues for bonding the photosensitive film to the card is avoided. It is another object of this invention to provide film record cards having better wear and damage resistance characteristics and finally it is the object of this invention to provide film record cards wherein the photosensitive surfaces are generally on the same plane as the remainder of the card body.

SUMMARY OF THE INVENTION

These and other objects are attained herein by casting a film from a film-forming emulsion directly into the aperture of the card body while supporting said card body on a suitable base which is nonadherent to said film such that as the film is formed it is adhered to the peripheral edges of said aperture. Upon removal of the base, an aperture card having a photosensitive film strongly adhered to the peripheral edges of the aperture is obtained.

DETAILED DESCRIPTION OF PREFERRED EMBODIMENTS

According to the present process, a film-forming solution is first prepared and case into the aperture of a record-type card while the card is supported on a suitable base which is nonadherent to the resulting film. The film is then dried and light sensitized by state of the art techniques so that it is firmly adhered to the peripheral edges of the aperture.

For the purposes of this invention any record-type aperture card can be prepared in this manner, for example cards for recording, storing or processing data, such as Hollerith or IBM cards can be prepared. In a preferred embodiment, the cards are formed of a material which is receptive to printing, typewriting, or punched or magnetic coded data.

A suitable aperture can be die-cast through the card structure or the card structure can be prepared with a suitably formed aperture. The size of the aperture is not critical and is dependent only upon the desired size of the photosensitive material on the resulting card. Preferably, an aperture of an irregular periphery is desired so as to provide the greatest area upon which the film may be bound. Thus, the edges of the aperture may be serrated, notched, wavy, dovetailed or otherwise irregularly shaped.

The film-forming solution used in this invention can be any suitable polymeric solution either in the form of a solvent solution, an emulsion or a latex dispersion. The polymeric film-forming material may be cellulose ester films such as cellulose acetate or may be any other suitable film-forming substances, such as acetate propionate, acetate butyrate, polyethylene, terephtalate, polyvinylidene chloride, polyvinyl chloride, polyvinyl acetate, and the like. For the preparation of vesicular-type film (or images) preferred is Saran QX 2127, a copolymer of vinylidene chloride/acrylonitrile.

The only limitation is that the film should be transparent so that light can pass through the film enabling easy readout of the information stored on the film.

A wide variety of solvents, emulsifiers, surfactants or wetting agents can be used to prepare the film-forming solution depending upon the particular polymeric composition selected as would be obvious to one of ordinary skill in the art.

The film-forming solution is coated, sprayed or poured over the aperture of the card while the card is supported on the base. For this purpose, any base material to which the resulting film is nonadherent is suitable, for example, particularly suitable base materials include Mylar, stainless steel, Teflon, copper, glass and the like. Alternatively, the base may comprise a material which is adherent to the film but which is coated with a suitable mold release agent such as silicone oil, and the like, to permit removal of the film from the base without injury.

Figure 1:
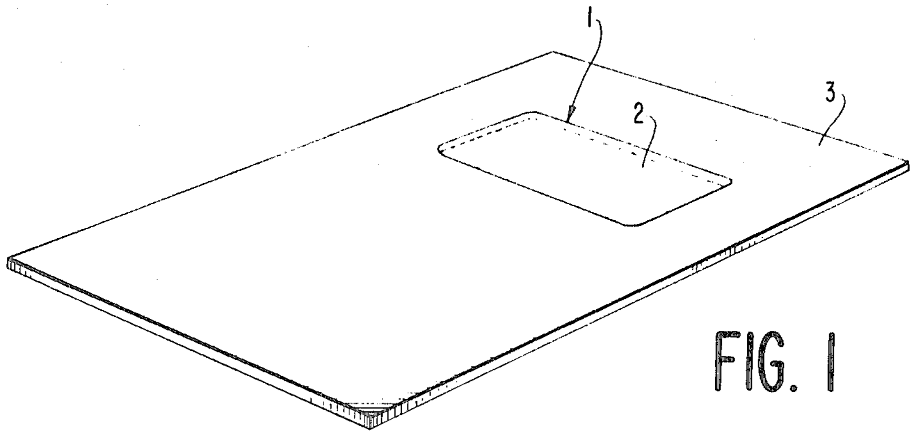
FIG. 1 is a view of a record card having an aperture and having a photosensitive film mounted within said aperture.
Figure 2:
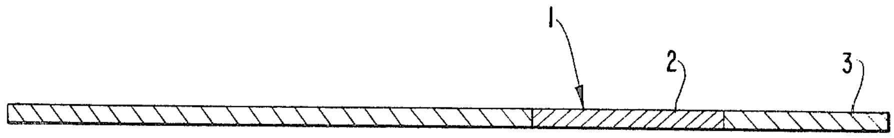
FIG. 2 is a partial sectional view of a record card having an aperture and having a photosensitive film mounted within said aperture.

By positioning the base such that it completely covers the underside of the aperture in a sealed relationship, the base and sides of the aperture will provide a moldlike cavity in which the film may be cast. Upon drying or removal of the solvent from the polymeric solution, a film is formed which is adhesively bound to the peripheral edges of the aperture. The base is removed from the aperture and the aperture card shown in FIGS. 1 and 2 is obtained. The resulting card contains an aperture 1 having a photosensitive film 2 in a card body 3. Preferably, the surface of the film is on the same plane as the surface of the card, as shown in FIG. 2, but it should be understood that for special purposes, one or both surfaces of the film may be on a higher or lower plane than that of the card. By this technique, however, the raised edges of the prior art aperture cards, which have resulted in uneven surface wear, can be avoided.

The film may be rendered photosensitive by the application of a suitable photosensitive material such as a silver halide emulsion. Any suitable silver halide emulsion can be used within the context of this invention, such as the Lippmann type emulsion which is prepared by admixing the following solution:

| | |
|---|---|
| Solution A. | |
| Distilled water | 120 cc. |
| Gelatin | 8 g. |
| Potassium bromide | 1.4 g. |
| Potassium iodide | 0.02 g. |

| | |
|---|---|
| Solution B. | |
| Distilled water | 70 cc. |
| Gelatin | 8 g. |
| Distilled water | 15 cc. |
| Silver nitrate | 2 g. |
| Ammonia | Q.S. |

Alternatively, a photosensitive diazo-type film can be prepared whereby the polymeric solution is first applied to the aperture as above described and before it is completely dried a solution of p-dimethylaminobenzene diazonium chloride and the sodium salt of 2,3-dihydroxy-naphthalene-6-sulfonic acid as the coupling component is applied to the partially dried first layer so as to penetrate and form an intimate bond therewith. The sensitizing solution which can be in the form of either an emulsion or a solvent solution can then be applied to the first layer by spraying, pouring or coating in the same manner as the polymeric layer. The light-sensitized film can now be exposed to an image-producing light pattern and developed such as by an IBM microcopier. Another technique can be used in preparing a vesicular film by incorporating a diazo sensitizer such as diazonium dimethylaniline zinc chloride into a polymeric compound. The resulting sensitizing composition can thereafter be used either alone or in the form of a solvent solution and can be applied by any of the techniques described above.

A better understanding of this invention can be gained by reference to the following specific examples which are presented for purposes of illustration only and are not intended to be limiting in any manner:

EXAMPLE 1

A standard paper card having a 2-inch × 1½-inch aperture was supported on 5-mil Mylar base. A film-forming emulsion was prepared as follows:

| | |
|---|---|
| Saran QX2127 | 3½ parts |

A copolymer of vinylidene-chloride/acrylonitrile

| | |
|---|---|
| Acryloid | 2½ parts |

(A mixture of polyesters of acrylic and methacrylic acids)

| | |
|---|---|
| Methylethyl ketone | 9 parts |

A sensitizing solution was prepared as follows:

| | |
|---|---|
| p-diazodimethylaniline zinc chloride | 0.6 parts |
| Acetonitrile | 3 parts |

The sensitizing solution was added slowly to the film-forming emulsion and the mixture was poured into the card aperture so as to contact the peripheral edges and the Mylar base. The solution was dried in a hot oven for 5 minutes and the Mylar base was removed. The film thus formed in the aperture was found to be strongly adherent to the periphery of the aperture. Tests showed that the bond was as strong as the film itself. The photosensitive film thus provided was exposed and developed in an IBM microcopier and the image produced was exceptionally sharp and clear.

The card structures which can be treated by the techniques of the present invention can be composed of any suitable material, such as paper, cardboard, various types of plastics, etc. The only limitation is that the film-forming composition must be capable of adhering to the peripheral areas of the aperture in the card. Hence, if the composition of the card structure is such as to prevent the film-forming solution from adhering thereto, it is only necessary to coat the peripheral edges of the aperture within the card structure with a material to which the film-forming solution will adhere.

It will be understood by one of ordinary skill in the art that many modifications can be made to the present invention without departing from the spirit or scope thereof. For example, several films may be deposited within the card aperture to provide additional strength or other physical characteristics or to provide a filtering effect for the underlying image. This invention is therefore only intended to be limited by the following claims.

1. A method for forming an aperture-type record card which comprises:
   a. supporting a card structure having at least one aperture substantially the size of a desired film frame on a suitable base, said base being positioned under said card so as to cover the opening of said aperture,
   b. applying a photographic film-forming solution into said opening so as to completely fill said aperture and contact the peripheral edges of said aperture and said base,
   c. drying said film-forming solution so as to form a film which is strongly adherent to said peripheral edges of said aperture, and
   d. removing said base so as to form a record card having a photographic film formed in situ in said record card.

2. The process of claim 1 wherein said film-forming solution is a film-forming emulsion.

3. The process of claim 2 wherein said film-forming emulsion is a vinylidene chloride/acrylonitrile copolymer emulsion.

4. The process of claim 1 wherein said film-forming solution is applied to said aperture by coating.

5. The process of claim 1 wherein said base is a polyester base.

6. The process of claim 1 wherein said film-forming solution contains a light-sensitizing agent.

7. The process of claim 6 wherein light-sensitizing agent is p-diazodimethylaniline zinc chloride.

8. The process of claim 1 wherein a silver halide emulsion is applied to said aperture so that the surface of the resulting film is on the same plane as the surface of said card structure.

9. The process of claim 6 wherein the photosensitive film resulting from the use of said film-forming solution is exposed to a microimage producing light pattern which is thereafter developed so as to produce a microfilm containing a record card.